United States Patent
Dowski, Jr.

(10) Patent No.: US 7,679,830 B2
(45) Date of Patent: *Mar. 16, 2010

(54) OPTICAL SYSTEMS UTILIZING MULTIPLE PHASE FILTERS TO INCREASE MISFOCUS TOLERANCE

(75) Inventor: Edward Raymond Dowski, Jr., Lafayette, CO (US)

(73) Assignee: The Regents of the University of Colorado, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/671,397

(22) Filed: Feb. 5, 2007

(65) Prior Publication Data

US 2007/0127041 A1    Jun. 7, 2007

Related U.S. Application Data

(63) Continuation of application No. 10/810,446, filed on Mar. 25, 2004, now Pat. No. 7,180,673.

(60) Provisional application No. 60/458,299, filed on Mar. 28, 2003.

(51) Int. Cl.
  *G02B 27/14* (2006.01)
  *G02B 13/18* (2006.01)
  *G02B 3/02* (2006.01)
(52) U.S. Cl. ..................... 359/637; 359/708
(58) Field of Classification Search .............. 359/637, 359/708, 722, 723, 885, 888, 894
See application file for complete search history.

(56) References Cited

U.S. PATENT DOCUMENTS 3,305,294 A    2/1967    Alvarez (Continued)

FOREIGN PATENT DOCUMENTS

WO    WO 99/35529    7/1999

(Continued)

OTHER PUBLICATIONS

Van Der Gracht, Joseph; Dowski, Edward R.; Taylor, Merwyn G.; Deaver, Dawne M., "Broadband behavior of an optical-digital focus-invariant system," Optics Letters, Jul. 1, 1996, pp. 919-921, vol. 21, No. 13, Optical Society of America.

(Continued)

*Primary Examiner*—Alicia M Harrington
(74) *Attorney, Agent, or Firm*—Lathrop & Gage LLP (57) ABSTRACT

An optical imaging system includes optics for imaging a wavefront of electromagnetic radiation to form an image at a detector. The system also includes a plurality of optical phase filters. Each of the phase filters alters phase of the wavefront. The phase filters cooperate to make the system less sensitive to misfocus, as compared to the optical imaging system without the phase filters. Another optical imaging system includes a detector and optics having two or more optical elements for imaging a wavefront onto the detector. The optical elements include aspherical surfaces that cooperate to alter phase of the wavefront such that the optics are less sensitive to defocus as compared to the optics without the aspherical surfaces. The system also includes a post processor for reversing phase alteration induced by the aspherical surfaces to produce an in-focus electronic image.

25 Claims, 10 Drawing Sheets

U.S. PATENT DOCUMENTS

| | | | |
|---|---|---|---|
| 3,583,790 | A | 6/1971 | Baker |
| 4,174,885 | A | 11/1979 | Joseph et al. |
| 4,650,292 | A | 3/1987 | Baker et al. |
| 4,925,281 | A | 5/1990 | Baker |
| 4,936,661 | A | 6/1990 | Betensky et al. |
| 5,071,207 | A | 12/1991 | Ceglio et al. |
| 5,102,223 | A | 4/1992 | Uesugi et al. |
| 5,248,876 | A | 9/1993 | Kerstens et al. |
| 5,521,695 | A | 5/1996 | Cathey, Jr. et al. |
| 5,565,668 | A | 10/1996 | Reddersen et al. |
| 5,748,371 | A | 5/1998 | Cathey, Jr. et al. |
| 5,870,179 | A | 2/1999 | Cathey, Jr. et al. |
| 6,069,738 | A | 5/2000 | Cathey, Jr. et al. |
| 6,091,548 | A | 7/2000 | Chen |
| 7,158,317 | B2 | 1/2007 | Ben-Eliezer et al. |
| 2002/0118457 | A1 | 8/2002 | Dowski, Jr. |
| 2002/0134921 | A1 | 9/2002 | Cathey, Jr. |
| 2003/0127584 | A1 | 7/2003 | Dowski, Jr. et al. |
| 2004/0145808 | A1 | 7/2004 | Cathey, Jr. et al. |
| 2004/0190762 | A1 | 9/2004 | Dowski, Jr. et al. |
| 2004/0257543 | A1 | 12/2004 | Dowski, Jr. et al. |
| 2005/0088745 | A1 | 4/2005 | Cathey, Jr. et al. |

FOREIGN PATENT DOCUMENTS

| | | |
|---|---|---|
| WO | WO 99/57599 | 11/1999 |
| WO | WO 01/99431 A3 | 12/2001 |
| WO | WO 02/19723 | 3/2002 |
| WO | WO 02/052331 A3 | 7/2002 |
| WO | WO 02/057832 A3 | 7/2002 |
| WO | WO 02/099511 | 12/2002 |
| WO | WO 03/009041 A3 | 1/2003 |
| WO | WO 03/021333 A1 | 3/2003 |
| WO | WO 03/052492 | 6/2003 |
| WO | WO 03/073153 A1 | 9/2003 |
| WO | WO 2005/054927 | 6/2005 |

OTHER PUBLICATIONS

Elkind, Dina; Zalevsky, Zeev; Levy, Uriel; Mendlovic, David, "Optical transfer function shaping and depth of focus by using a phase only filter," Applied Optics, Apr. 10, 2003, pp. 1925-1931, vol. 42, No. 11, Optical Society of America.

Tucker, Sara C.; Cathey, W. Thomas; Dowski, Edward R., Jr., "Extended depth of field and aberration control for inexpensive digital microscope system," Optics Express, May 24, 1999, pp. 467-474, vol. 4, No. 11, Optical Society of America.

Greengard, Adam; Cathey, Thomas W., "Extended depth of field with a nonlinear silver-halide emulsion detector," Applied Optics, Oct. 10, 2002, pp. 6075-6079, vol. 41, No. 29, Optical Society of America.

Dowski, Edward R., Jr.; Cathey, Thomas W.; Bradburn, Sara C., "Aberration Invariant Optical/Digital Incoherent Systems," Optical Review, 1996, pp. 429-432, vol. 3, No. 6A.

Van Der Gracht, Joseph; Dowski, Edward R., Jr.; Cathey, Thomas W.; Bowen, John P., "Aspheric optical elements for extended depth of field imaging," SPIE, 1995, pp. 279-288, vol. 2537.

Van Der Gracht, Joseph; Euliss, Gary W., "Information optimized extended depth-of-field imaging systems," Proceedings of SPIE vol. 4388, 2001, pp. 103-112.

Fukada, Hiroshi; Kbayashi, Yasushi; Hama, Katsunobu; Tawa, Tsutomu; Okazaki, Shinji, "Evaluation of Pupil-Filtering in High-Numerical Aperture I-Line Lens," Jpn. J. Applied Physics, Dec. 1993, pp. 5845-5849; vol. 32, Pt. 1, No. 12B.

Bradburn, Sara; Cathey, Wade Thomas; Dowski, Edward R., Jr., "Realizations of focus invariance in optical-digital systems with wave-front coding," Applied Optics, Dec. 10, 1997, pp. 9157-9766; vol. 36, No. 35, Optical Society of America.

Chen, H.Y.; Mayhew, N.; Paige, E.G.S.; Yang, G.G., "Design of point spread function of a lens, binary phase filter combination and its application to photolithography," Optics Communications, Sep. 1, 1995, pp. 381-389; vol. 119; Elsevier Science B.V.

Plummer, et al. "Photographic Optical Systems With Nonrotational Aspheric Surfaces" Applied Optics, vol. 38, No. 16, pp. 3572-3592, Jun. 1, 1999.

OPTICAL SYSTEMS UTILIZING MULTIPLE PHASE FILTERS TO INCREASE MISFOCUS TOLERANCE

CROSS-REFERENCE TO RELATED APPLICATIONS

This application is a continuation of commonly-owned U.S. patent application Ser. No. 10/810,446, filed 25 Mar. 2004, now U.S. Pat. No. 7,180,673 which claims priority to U.S. Provisional Application Ser. No. 60/458,299, filed 28 Mar. 2003. Both of the aforementioned patent applications are incorporated herein by reference.

BACKGROUND

Prior art optical design within optical imaging systems has primarily focused on optical elements and the detector used to capture an image. Such optical elements typically include lenses and mirrors that focus and magnify optical radiation. The detector is, for example, an analog detector (e.g. film) or a digital detector (e.g., CCD or CMOS array) that detects the optical radiation to render a final image.

Mechanical adjustment of optical elements is also known in the prior art to control and obtain best focus within optical imaging systems. The most common method of mechanical adjustment is to vary the distance of the image plane by moving a lens. Other mechanical adjustment methods involve interchanging lens elements with different focusing power.

One form of optical focusing through mechanical means involves transverse movement of two optical elements, as described in U.S. Pat. No. 3,305,294. In the '294 patent, a pair of aspherical optical elements moves transversely in equal but opposite displacements. The form of the aspherical optical elements is defined by polynomials that are strongly dependent on the cubic terms of a power series of two variables.

An improvement to the focusing method in the '294 patent is described in U.S. Pat. No. 3,583,790. The '790 patent allows lateral movement of only one aspheric optical element as opposed to two aspheric optical elements, as required by the '294 patent.

Another method of modifying focus is described in U.S. Pat. No. 4,650,292. In the method of the '292 patent, two or more aspherical optical elements are rotated about axes decentered with respect to the optical axis, to modify focus. The aforementioned prior art thus facilitates obtaining best focus within the imaging system by using mechanical means. If one of the optical elements of the imaging system changes, e.g., due to thermal conditions, then the system may lose focus and, unacceptably, the image. Moreover, aside from changes in focal length and aperture, the depth of focus, depth of field and amount of anti-aliasing of the imaging system remain unchanged. Furthermore, if there is a change of focal length and/or aperture, there is no present way, for example, to maintain a fixed depth of focus, depth of field and/or anti-aliasing effects, if desired.

The aforementioned patents (U.S. Pat. Nos. 3,305,294; 3,583,790; 4,650,292) are incorporated herein by reference.

SUMMARY

In one aspect, mechanical adjustment of phase filters is provided to modify wavefront phase and extend depth of field (and/or depth of focus) within an optical imaging system. Such mechanical adjustment may modify the wavefront phase to control aberration-tolerance and/or anti-aliasing properties of the imaging system.

In one aspect, wavefront phase is modified by movement of phase filters. In one example, the phase filters are arranged along the optical axis of the imaging system. Each of the phase filters modifies the wavefront phase in a particular way, to encode the wavefront with a phase function. In one aspect, the filters have the same phase function but are rotated relative to one another to effect the desired wavefront phase modification.

Those skilled in the art will appreciate that mechanical adjustment of the phase filters may occur in several ways to effect the desired phase change in the wavefront, without departing from the scope thereof. For example, in one aspect a phase filter is moved transversely to the optical axis to modify wavefront change as a function of the transverse movement; such a phase filter has a phase function that accommodates the transverse movement to effect the desired wavefront phase modification. In another aspect, a phase filter is rotated through different parts of the filter to effect wavefront phase modification; such a filter is, for example, a large disc through which the wavefront passes, wherein rotation of the disc encodes a new phase function onto the wavefront.

In another aspect, an optical imaging system with mechanical adjustment is provided that is particularly suited for use in digital imaging systems, such as digital cameras. Specifically, the optical system with mechanical adjustment modifies wavefront phase within the imaging system to effect desired depth of field, aberration-tolerance, and/or anti-aliasing properties. As above, the imaging system employs and selectively moves one or more phase filters to modify wavefront phase. A detector (e.g., a digital CCD or CMOS array, or analog film) is used to detect electromagnetic radiation after the phase filters. This electromagnetic radiation may take the form of a blurred, intermediate image. Digital image processing of data from the detector removes certain effects induced by the phase filters to render a final, in-focus image with the desired properties (i.e., depth of focus, depth of field, aberration-tolerance, anti-aliasing properties).

In one aspect, the digital image processing may be effected through a digital signal processor which has position information of the phase filters. The position information corresponds to a selected phase modification of the wavefront that invokes the desired properties. The selected phase modification is effectively removed during digital signal processing to yield the desired imaging properties.

Accordingly, in one aspect, a user interface provides for selective user phase modification of the wavefront to effect the desired properties. The user interface connects with a motor responsive to user inputs to modify wavefront phase in the appropriate way.

In another aspect, an optical system with mechanical adjustment facilitates variably extending depth of field and increasing aberration tolerance. The system has a first aspheric optical wavefront filter and a second aspheric optical wavefront filter. In one aspect, the first and second filters are parallel to one another and substantially share a common optical axis within the optical system. A means (e.g., a motor) is provided to rotate and/or translate the first optical filter with respect to the second optical filter. Both the first and second aspheric optical wavefront filters are constructed and arranged to alter the optical transfer function of the optical system in such a way that the altered optical transfer function is substantially insensitive to aberrations over a greater range of aberrations than was provided by the unaltered optical transfer function.

In one aspect, the amount of alteration of the optical transfer function is chosen by rotating (and/or translating) the first filter with respect to the second filter, and vice versa. Those skilled in the art appreciate that other movements of the phase filters may be applied to the wavefront within the optical system to obtain similar function and modification of the optical transfer function, to obtain the desired imaging properties.

In another aspect, the optical imaging system with mechanical adjustment is configured for imaging an object, and further has (a) a detector that detects an intermediate image of the object and (b) an image processor that processes data from the detector to reverse certain effects induced by the first and second optical wavefront filters, thereby generating a final image with the desired imaging properties.

In another aspect, the means to rotate and/or translate the first and second optical wavefront filters is a motor and control sub-system. The motor and control sub-system may be an automatic motor and control sub-system that provides mechanical adjustment of the wavefront phase to effect desired imaging properties (e.g., depth of focus, aberration-tolerance, anti-aliasing effects).

In one aspect, user input may be supplied to optical system via a user interface for controlling the means to rotate and/or translate the optical filters, for example to selectively control focusing of optical system and/or aberration reduction therein.

In still another aspect, the optical system with mechanical adjustment has a non-linear analog image detector, such as photographic film. The non-linear analog image detector, after detecting an image of the object, is scanned or sampled and values are linearized to remove the non-linear input/output characteristics of the detector. Then, the post processing element processes the linearized image by reversing alteration to the optical transfer function of the optical system accomplished by the first and second optical wavefront filters.

The method of another aspect facilitates variably affecting the wavefront phase of an optical system to selectively extend depth of field and/or increase aberration tolerance by a variable amount. The method includes the steps of aligning one or more aspheric optical wavefront filters in the optical system, and moving the optical wavefront filters to alter phase of the wavefront. In one aspect, the method further includes the step of capturing the wavefront with a detector and processing data from the detector to reverse certain effects induced by the wavefront filters, to generate a final image with the desired image properties (e.g., depth of focus, aberration-tolerance, anti-aliasing). For example, in one aspect, the optical wavefront filters modify an optical transfer function of the optical system such that the altered optical transfer function is substantially insensitive to aberrations over a greater range of aberrations than was provided by the unaltered optical transfer function.

In still another aspect, the motor and controller changes the aperture of the optical imaging system (e.g., by adjusting a motorized aperture within the system). In and of itself, the aperture change can affect the imaging properties (e.g., depth of focus, depth of field, aliasing properties, aberration tolerance) of the optical system—which may not be desired. Accordingly, the motor and controller may additionally move the optical filter(s) so as to modify phase of the wavefront, to readjust the imaging properties so that they remain unchanged even with the change of aperture size. In this way, for example, one can maintain a depth of field in object space irrespective of a change of aperture.

In another aspect, the motor and controller changes the focal length of the optical imaging system (e.g., by moving a lens of the system). In and of itself, the focal length change can affect the imaging properties (e.g., depth of focus, depth of field, aliasing properties, aberration tolerance) of the optical system—which may not be desired. Accordingly, the motor and controller may additionally move the optical filter(s) so as to modify phase of the wavefront, to readjust the imaging properties so that they remain unchanged even with the change of focal length. In this way, for example, one can maintain a depth of field in object space irrespective of a change of focal length.

DETAILED DESCRIPTION OF THE INVENTION

Figure 1:
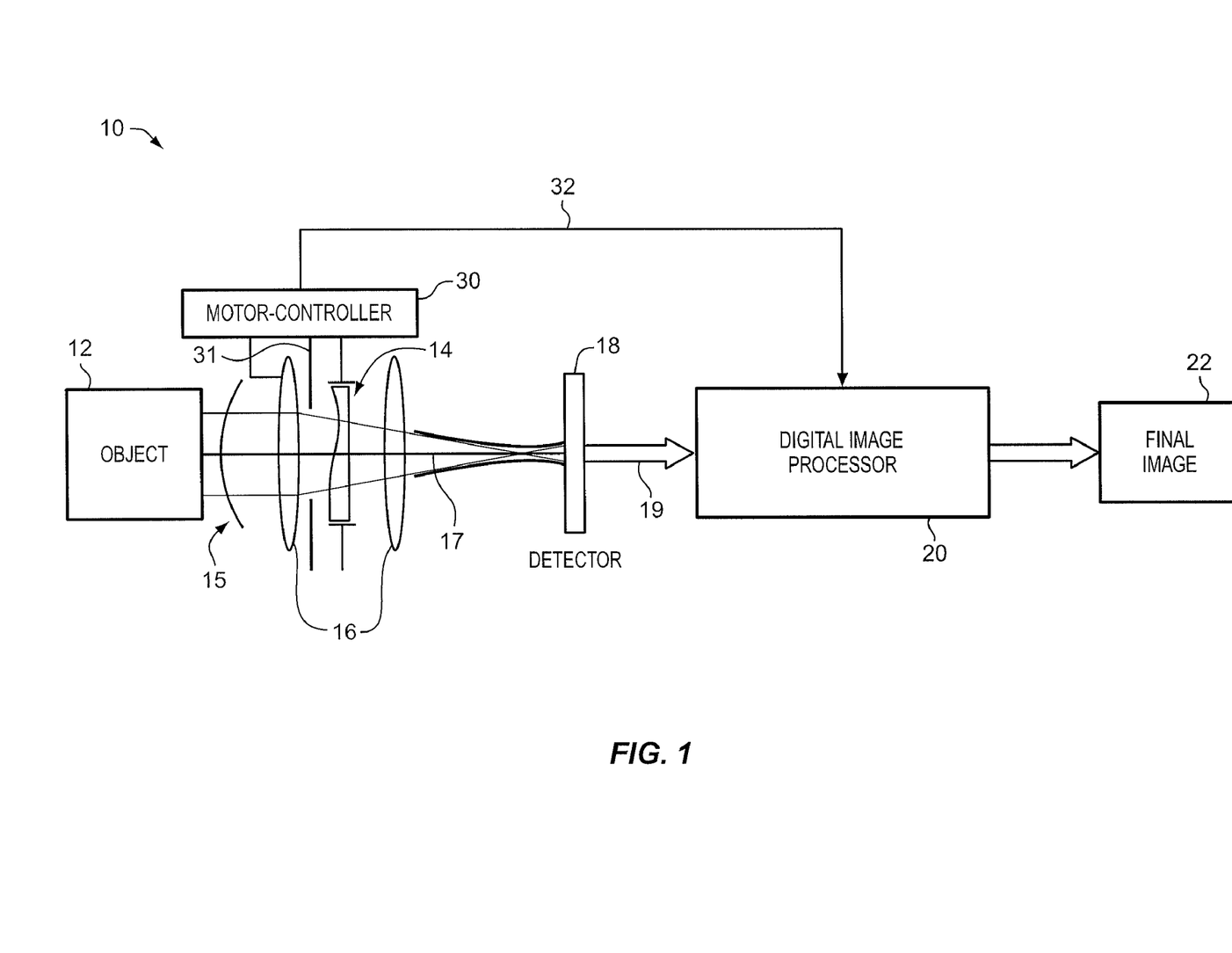
FIG. 1 shows one optical imaging system with mechanical adjustment of a phase filter.

FIG. 1 shows one optical system 10 that selectively obtains desired imaging properties (e.g., depth of field, aberration tolerance, anti-aliasing) through wavefront coding and mechanical adjustment. Wavefront coding occurs through operation of optical phase filter 14, which is for example a phase mask that employs aspheric surfaces to modify phase of a wavefront 15 between object 12 and detector 18. Optics 16 (e.g., lenses and/or mirrors) operate to focus wavefront 15 to detector 18, as shown.

Detector 18 digitally captures the focused electromagnetic radiation of wavefront 15. A digital image processor 20 post-processes data 19 from detector 18 to "undo" certain effects induced by optical phase filter 14, to obtain the desired imaging properties (e.g., to increase in the depth of field of system 10, to decrease in wavelength sensitivity, to change aliasing effects, and/or to change tolerance of optics 16 to misfocus-related aberrations). To "undo" the certain effects, digital image processor 20 removes the spatial blur generated by phase filter 14; at the same time, optics 16 and phase filter 14 operate to ensure that the spatial effects are substantially constant over the range corresponding to the desired imaging properties. Image processor 20 effectively performs a reverse convolution with the spatial blur generated by phase filter 14, utilizing other system parameters as needed and desired to change or enhance the imaging properties. System 10 thus produces a final image 22 with these desired image properties (e.g., a clear image over a selected depth of focus) as described in more detail below.

Phase filter 14 is positioned, rotated and/or translated within optical system 10 by a motor and controller 30 to effect desired phase modification of wavefront 15. Through feedback 32 with motor and controller 30, digital image processor 20 has positional information of optical phase filter 14; this information is utilized within digital image processor 20 to "undo" the spatial effects induced by optical phase filter 14 on the image formed at the detector 18.

In one embodiment, optical phase filter 14 is at an aperture of optical imaging system 10 (or at an image of the aperture), such that the point spread function (PSF) of system 10 is substantially insensitive to misfocus and such that the optical transfer function (OTF) of system 10 has no zero-value regions within a passband of detector 18. Because the OTF is devoid of zero value regions, digital image processor 20 may obtain final image 22 by undoing the spatial effects of optical phase filter 14. Since the OTF is insensitive to misfocus, digital image processor 20 generates final image 22 with the desired imaging properties. U.S. Pat. No. 5,748,371 describes wavefront coding to extend depth of field and is incorporated herein by reference.

Through operation of motor and controller 30, optical phase filter 14 may also be positioned within system 10 at a principal plane (or image of the principal plane), at an aperture stop (or image of the aperture stop), and/or at a lens (e.g., with optics 16). Such positioning ensures that system 10 minimizes vignetting. In one embodiment, optical phase filter 14 modifies only phase of the wavefront between object 12 and detector 18 so as to minimize energy losses within system 10. Those skilled in the art appreciate that filter 14 may be incorporated with optics 16 (e.g., as a wavefront encoded surface of an optical element representing optics 16).

As described earlier, motor and controller 30 positions, rotates and/or translates optical phase filter 14 within system 10. FIGS. 2A, 2B, 2C, 2D, 2E and 2F illustrate various exemplary mechanical movements and configurations of filter 14 relative to the optical footprint 40 of wavefront 15 at filter 14. For example, in one embodiment illustrated in FIG. 2A, motor and controller 30 positions filter 14A within system 10 in the pathway of wavefront 15 (position A, FIG. 2A), and alternatively positions filter 14A out of the pathway of wavefront 15 (position B, FIG. 2A) by translational movement 42. In such an embodiment, filter 14A therefore affects wavefront 15 in position A, and has no effect on the wavefront in position B.

Figure 2A:
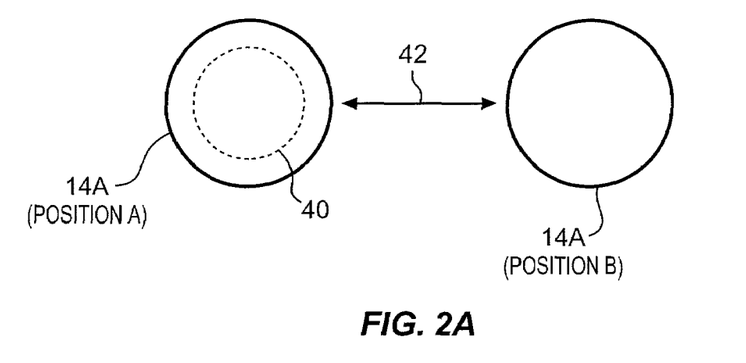
FIGS. 2A, 2B, 2C, 2D, 2E, 2F, 2G, 2H illustrate phase forms, surface configurations, and/or mechanical motions for exemplary phase filters.

Those skilled in the art appreciate that another like filter 14A may also be included within a system of this embodiment so as to provide, for example, two phase states of wavefront 15. In a first phase state, wavefront 15 is affected by two filters 14A (both in position A); in a second phase state, wavefront 15 is affected by one filter 14A (one filter 14A in position A, the other filter 14A in position B).

Figure 2B:
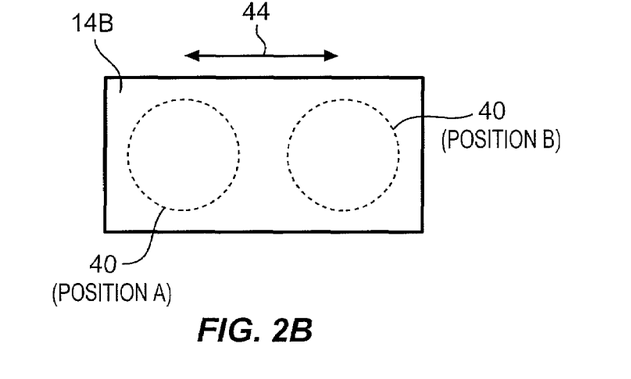

In another embodiment shown in FIG. 2B, motor and controller 30 translates optical phase filter 14B transverse to optical axis 17 (e.g., perpendicular to axis 17), along movement direction 44, to modify phase of wavefront 15 in at least two different positions of transverse movement 44. For example, the phase modification of wavefront 15, by filter 14B, is different at position A within FIG. 2B as compared to position B. For example, the phase function implemented within filter 14B is different depending upon whether footprint 40 is at position A or position B.

Figure 2C:
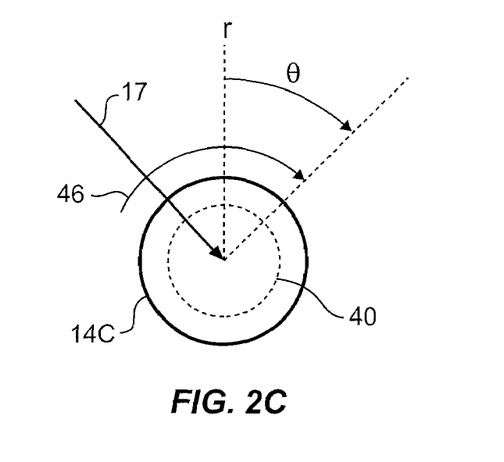
Figure 2D:
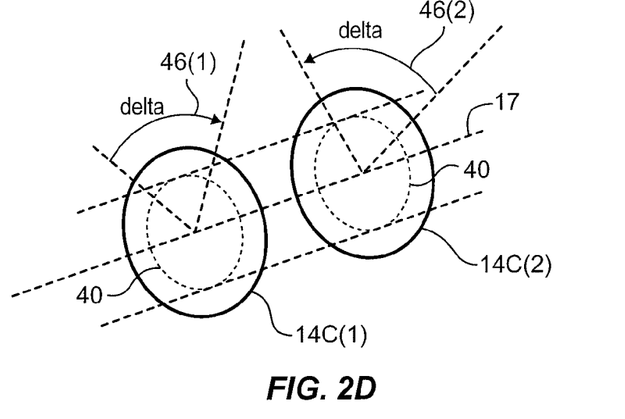

In yet another embodiment shown in FIG. 2C and FIG. 2D, motor and controller 30 rotates filter 14C (rotational movement direction 46) in a plane relative to optical axis 17 (e.g., the plane may for example be perpendicular to axis 17) to modify phase of wavefront 15 as a function of rotational position (θ, or "theta"). FIG. 2D illustrates that two like filters 14C(1), 14C(2) may be similarly positioned along optical axis 17; motor and controller 30 then operates, for example, to rotate filters 14C in opposite rotational directions 46(1), 46(2), as shown.

Figure 2E:
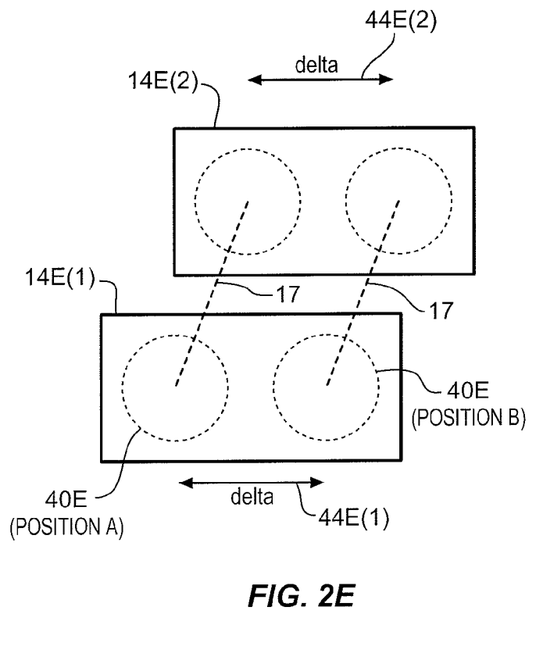

In a similar embodiment shown in FIG. 2E, motor and controller 30 translates filters 14E(1), 14E(2) in transverse motions 44E(1), 44E(2), respectively, to generate the desired phase effect on wavefront 15. One or both of filters 14E may be moved at any one time, depending upon the phase function of these filters.

Figure 2F:
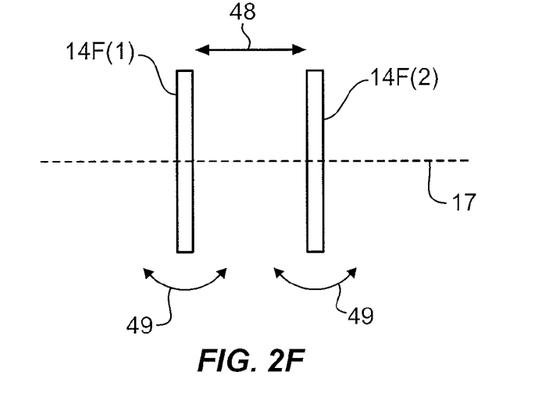

In yet another embodiment, two phase filters 14F(1), 14F(2) are shown along optical axis 17 in FIG. 2F. In this configuration, motor and controller 30 may move one or both of filters 14F along direction 48 to vary the combined wavefront phase caused by filters 14F. In another embodiment, motor and controller 30 operate to tilt (e.g., along directions 49(1), 49(2)) one or both of filters 14F to provide desired phase change through the pair of filters 14F, thereby "encoding" wavefront 15 in a way so as to achieve the desired image properties.

FIG. 2A-2F also illustrate that phase filter 14 may take various physical forms (e.g., rectangular, FIG. 3B, or circular, FIG. 2A and FIG. 2C) without departing from the scope hereof.

Accordingly, in one embodiment, the phase function of optical filter 14 is designed to induce the desired phase change of wavefront 15 according to the motion (e.g., movement directions 42, 44, 46, 46(1) and 46(2), 44E(1) and 44E(2), 48 or 49) of motor controller 30, such as described below in connection with FIG. 3-FIG. 6.

For example, the phase function P (equivalent to surface height) of filter 14C(1) and 14C(2) may for example take the phase form of Equation 1:

$$P(r,\theta) = A(r) * \text{Sum}[a_i \cos(w_i \theta + \phi_i)] + B(r) \quad \text{(Eq. 1)}$$

where r denotes the filter radius value and θ denotes the filter angular coordinate. The summation (sum, or Σ) is over the index i and A(r) is a function of r multiplied by a function that is a sum of cosine terms. The composite phase modification of wavefront 15 passing through both filters 14C(1), 14C(2) is then shown in Equation 2, that is motor and controller 30 adjusts phase of wavefront 15 according to rotational movement of filter 14C(1) and 14C(2) about optical axis 17. In particular, assume for example that only one term of the cosine summation is used. If Δ is zero, filters 14C(1), 14C(2) are perfectly aligned. Motor and controller 30 thus operates to rotate filters 14C(1), 14C(2) as a function of Δ. With equal and opposite rotations (plus and minus Δ, respectively) of filters 14C(1), 14C(2), the combined phase becomes:

$$\begin{aligned}
P_c(r, \theta) &= \{\text{Phase of filter } 14C(1) \text{ with rotation of } (+\Delta)\} + \\
&\quad \{\text{Phase of filter } 14C(2) \text{ with rotation of } (-\Delta)\} \\
&= \{A(r) * \cos(w*\theta + \Delta) + B(r)\} + \\
&\quad \{A(r, \theta) * \cos(w*\theta - \Delta) + B(r)\} \\
&= A(r)[\cos(w*\theta + \Delta) + \cos(w*\theta - \Delta)] + 2*B(r) \\
&= 2*\cos(\Delta)A(r)\cos(w*\theta) + 2*B(r)
\end{aligned} \quad \text{(Eq. 2)}$$

Accordingly, the combined phase (e.g., affecting the amount of variation within the depth of field) is modulated by different rotations 46 by motor and controller 30, affecting Δ through the term cos(Δ) of Eq. 2. For rotation values where Δ=90 degrees, the combined phase of the non-rotationally symmetric term can be reduced to zero. At this value of Δ, the wavefront is minimally modified and the amount of extended depth of field, aberration tolerance, anti-aliasing, etc., is also minimized. For rotation values of Δ that are multiples of 360 degrees, the combined phase of the non-rotationally symmetric term is maximized; at these values of Δ, the amount of extended depth of field, aberration tolerance, and anti-aliasing are also maximized. The rotationally symmetric component B(r) is unchanged in form, and is optional. The cosine terms can be replaced by sums of cosines and hyperbolic functions with equivalent result.

Figure 2G:
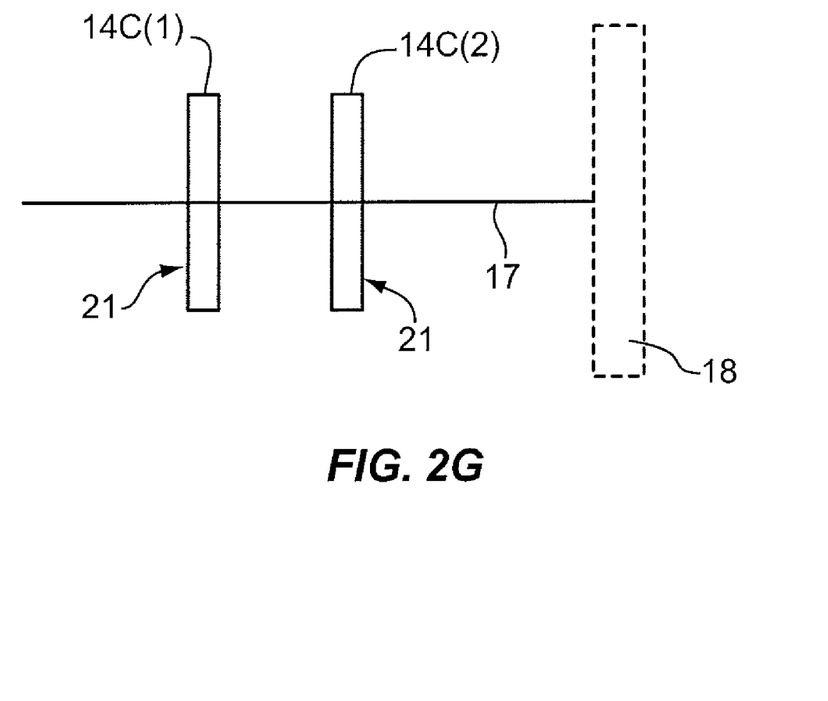

A side view of filters 14C(1), 14C(2) is shown in FIG. 2G. FIG. 2G is shown to illustrate that in the above example of Equation 2, the phase form (Eq. 1) of filters 14C occurs on a first side 21(1) of phase filter 14C(1) and on a first side 21(2) of phase filter 14C(2), each facing upstream from detector 18, as shown.

In another example, the phase function P (equivalent to surface height) of filters 14E(1), 14E(2) may for example take the following form:

$$P(x,y) = \alpha\{x^4 + y^4\} \quad \text{(Eq. 3)}.$$

where x and y are Cartesian coordinates of the phase function on filters 14E. The phase of wavefront 15 is encoded by passing through the pair of filters 14E according to translational movements Δ 44E(1), Δ 44E(2), respectively, of filters 14E. Motor and controller 30 controls the transverse motion Δ 44E(1), 44E(2) along the x=y direction (along a 45 deg. angle), to selectively adjust the phase modification of wavefront 15. With motion along the x=y direction, for example, the wavefront phase is altered in both the x and y directions as a function of motion Δ 44E (equal but opposite motions Δ 44E(1) and 44E(2) occurring simultaneously). The combined phase implemented by the collection of filters 14E(1) and 14E(2) is then:

$$P_c(x, y) = \{\text{Phase of filter } 14E(1) \text{ with translation of } (+\Delta)\} - \quad \text{(Eq. 4)}$$
$$\{\text{Phase of filter } 14E(2) \text{ with translation of } (-\Delta)\}$$
$$= \alpha\{(x-\Delta)^4 + (y-\Delta)^4\} - \alpha\{(x+\Delta)^4 + (y+\Delta)^4\}$$
$$= -8\alpha\{\Delta * (x^3 + y^3) + \Delta^3 * (x+y)\}$$

The phase of filter 14E(2) is the negative of the phase of filter 14E(1) in this example. Accordingly, by moving filters 14E(1), 14E(2) in equal but opposite directions, one provides positive phase change and one provides negative phase change. Notice that in this example phase form of the combined filters is a scaled cubic form (Δ*(x³+y³)) and a linear phase component (Δ³*(x+y)). By changing the translation Δ 44E (i.e., controlled by motor and controller 30 along a line of x, y), the amount of cubic phase (and a corresponding amount of desired imaging property, e.g., depth of field) can be varied. This translation also brings with it a linear phase, prism-like optical axis or image origin translation. So, in eq. 4, the first term is like a separable cubic and the second term is linear term similar to a prism effect (or tilt). The translation can be used as is, or the mechanism that translates the component parts can be such that the component parts physically tilt away from optical axis 17 (see FIG. 2F) with translation to the complement of the linear phase; more terms may be added to the optical surfaces to purposely remove tilt.

Figure 2H:
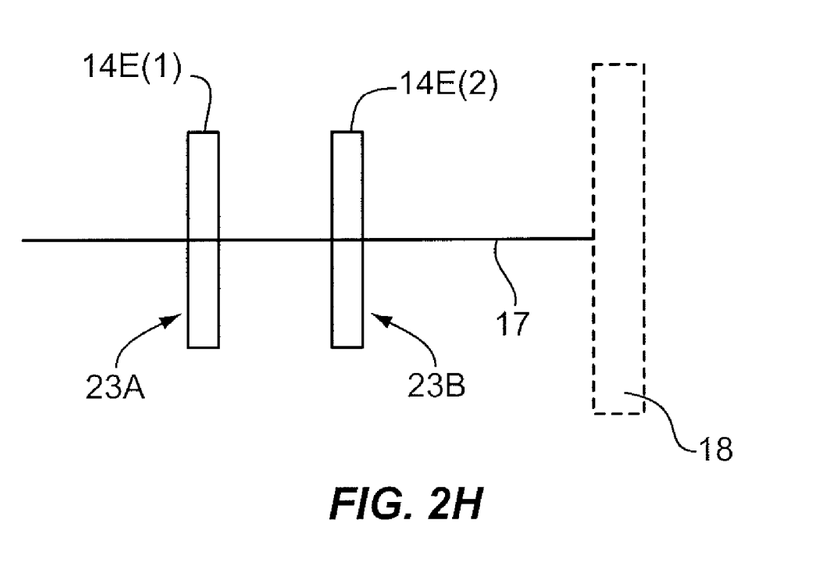

A side view of filters 14E(1), 14E(2) is shown in FIG. 2H. FIG. 2H is shown to illustrate that in the above example of Equation 4, the phase form (Eq. 3) of filters 14E occurs on the first side 23A of filter 14E(1) and the second side 23B of filter 14E(2), as oriented to detector 18, as shown. By reversing the directions of these filters, the phase of one can be the negative of the phase of the other.

It should be clear to those skilled in the art that phase filter 14 modifies wavefront 15 so that there is not an ideal focus at detector 18; each object point of object 12 is instead spatially blurred over an extended range about along axis 17. This blurring "encodes" wavefront 15 from object 12 to detector 18; digital imaging processor 20 then "decodes" the image from detector 18 according to the position of phase filter 14 (via feedback 32) to generate an enhanced final image 22. Image 22 is "enhanced" for example since it has a selected depth of focus. Image 22 may be further enhanced since it is selectively insensitive to certain optical aberrations, for example misfocus-related aberrations such as chromatic aberration, curvature of field, spherical aberration, astigmatism, and/or temperature, or pressure related misfocus associated with plastic optics. As such, optics 16 may advantageously employ plastic.

Moreover, detector 18 may create aliasing, such as when detector 18 is a CCD array. Accordingly, in one embodiment the phase function of phase filter 14 provides low-pass filtering to selectively inhibit effects of such aliasing as an enhancement to final image 22.

In one embodiment, motor and controller 30 also controls an aperture of system 10. By way of example, system 10 may include an electronically-controllable aperture 31 which responds to motor and controller 30 to adjust the aperture of system 10. When aperture 31 is adjusted, therefore, the depth of field (or depth of focus) changes. Accordingly, motor and controller 30 may additionally move phase filter 14 to adjust the depth of focus (or depth of field) so as to maintain constant image properties irrespective of the change of aperture 31, if desired. In a similar way, aberration tolerance and/or aliasing properties of system 10 may be adjusted to compensate for aperture variation. Digital image processor 20 may also utilize the aperture size information during processing by virtue of feedback 32.

In one embodiment, motor and controller 30 also controls the focal length of system 10. By way of example, motor and controller 30 may move optics 16 to effect the focal length adjustment. When the focal length is adjusted, therefore, the depth of field (or depth of focus) changes. Accordingly, motor and controller 30 may additionally move phase filter 14 to adjust the depth of focus (or depth of field) so as to maintain constant image properties irrespective of the change of focal length, if desired. In a similar way, aberration tolerance and/or aliasing properties of system 10 may be adjusted to compensate for focal length variation. Digital image processor 20 may also utilize the focal length information during processing by virtue of feedback 32.

Figure 3:
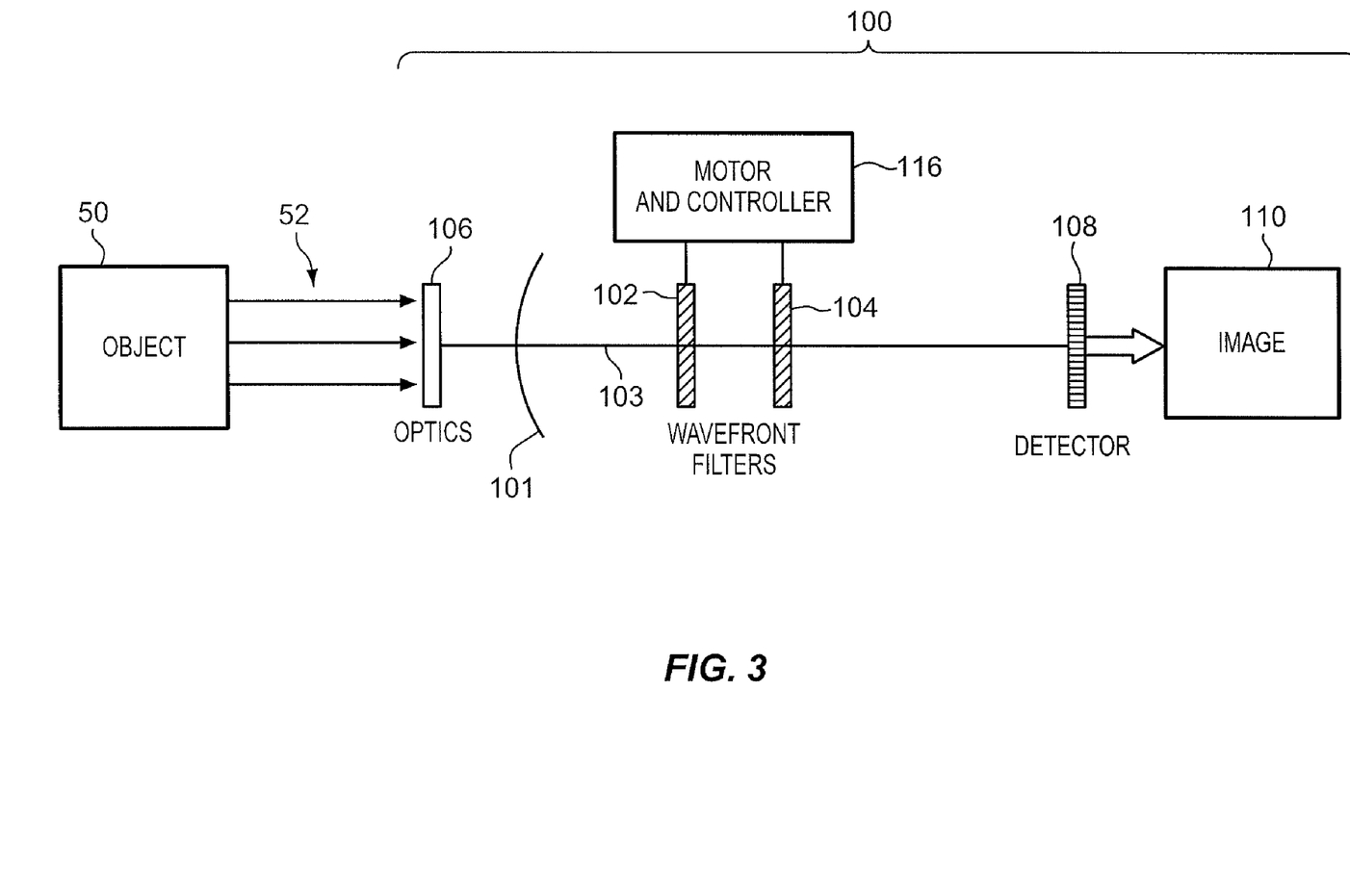
FIG. 3 shows one optical imaging system with mechanical adjustment of optical phase filters.

FIG. 3 shows one optical imaging system 100 with an extended depth of field through operation of mechanically-adjustable optical phase filters 102, 104. An object 50 generates or reflects electromagnetic radiation 52 that is captured by optics 106 of imaging system 100 to image object 50 to a detector 108; this imaging forms an optical wavefront 101 (illustrating points of constant phase from object 50) that passes through filters 102, 104. The depth of field of imaging system 100 is "enhanced" as compared to the same imaging system without filters 102, 104, as described in more detail below. In one embodiment, one or both of filters 102, 104 include aspheric optical elements. Those skilled in the art appreciate that although only two filters 102, 104 are shown, additional filters may be included without departing from the scope hereof.

Filters 102, 104 may move by operation of motor and controller 116. When motor and controller 116 moves filters 102, 104, the phase of wavefront 101 is modified to accomplish one or more of the following: modify the depth of field of imaging system 100, modify aberration-tolerance of imaging system 100, and modify anti-aliasing effects of detector 108. In one embodiment, such mechanical adjustment is effected by rotating one or both of filters 102, 104 about optical axis 103. To enhance the depth of focus, phase filters 102, 104 are moved to alter the optical transfer function (OTF) of system 100 (and specifically of optics 106) such that the resulting OTF is substantially insensitive to misfocus-related aberrations over a greater range of aberrations as compared to aberrations of optics 106 without filters 102, 104. In one embodiment, the variation of OTF is chosen by varying the amount of rotation of one phase filter 102 with respect to the other phase filter 104.

In one arrangement, phase filter 102 and phase filter 104 are placed at or near the aperture stop (or at an image of the aperture stop) of optical system 100, and one filter 104 is rotated relative to filter 102 (or vice versa). Filters 102, 104 may alternatively be positioned at a principal plane (or at an image of the principal plane) of system 100, or at a lens (e.g., at an optical element of optics 106). Although filters 102, 104 are shown adjacent to one another, in filters 102, 104 may be spaced apart from one another (one or both being on or off of axis 103) so long as they cooperate to change phase of wavefront 101 (when positioned by motor and controller 116). In one arrangement, filters 102, 104 are configured such that as one filter rotates, the other filter has an equal and opposite rotation to effect the phase modification onto wavefront 101.

Detector 108 detects focused electromagnetic radiation of wavefront 103 to form a final image 110, which is a digital representation of object 50. Electromagnetic radiation 52 may include electromagnetic radiation in the visible spectrum, but may also include electromagnetic radiation in the infrared spectrum, ultraviolet spectrum, radio wave spectrum, or other spectrum (or mixtures thereof). Detector 108 may be analog detector (e.g., photographic film) or digital detector (e.g., a CCD or CMOS array).

Figure 4:
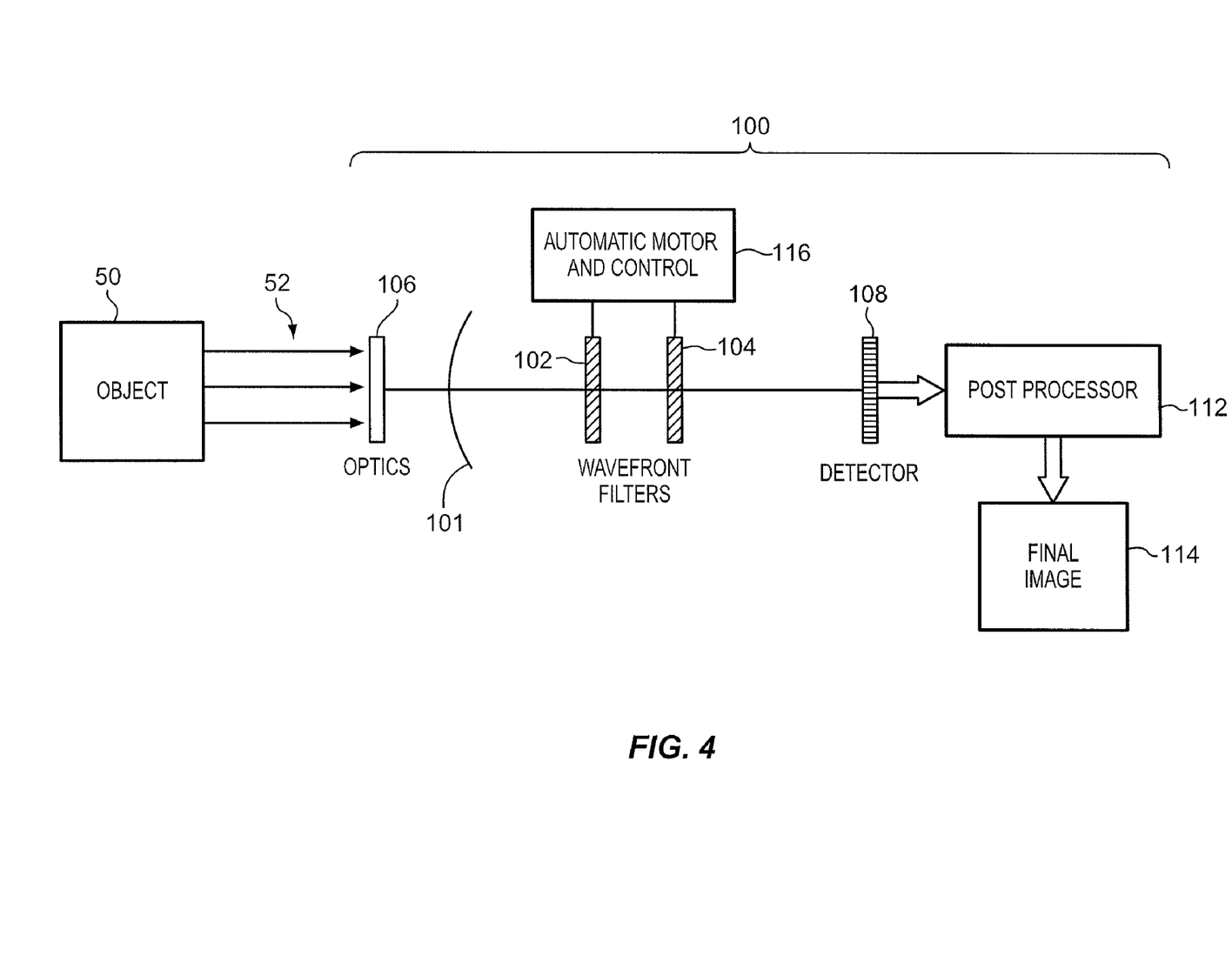
FIG. 4 shows the optical imaging system of FIG. 3 with a post processor.

FIG. 4 shows an optical imaging system 100' with a post processor 112, for example a digital filter, that performs post-processing on the image detected by detector 108 to form a final image 114. Post processor 112 removes certain effects of wavefront coding induced by filters 102, 104 to form final image 114, for example to provide a sharp and in-focus image. Optical system 100' is thus particularly well suited for use in digital imaging systems, such as digital cameras, because of the linear response of detector 108 in the form of a digital detector.

Rotation of filters 102, 104 (e.g., each moving as in direction 46, FIG. 2C) may occur through operation of a motor and controller 116'; motor and controller 116' may operate automatically or in response to user commands. Those skilled in the art appreciate that filters 102, 104 may instead be manually adjusted and/or rotated. In one embodiment, initial manual adjustment occurs during assembly of optical system 100', and further operational adjustment occurs by operation of motor and controller 116', providing a large range of phase modification for wavefront 101.

Figure 5:
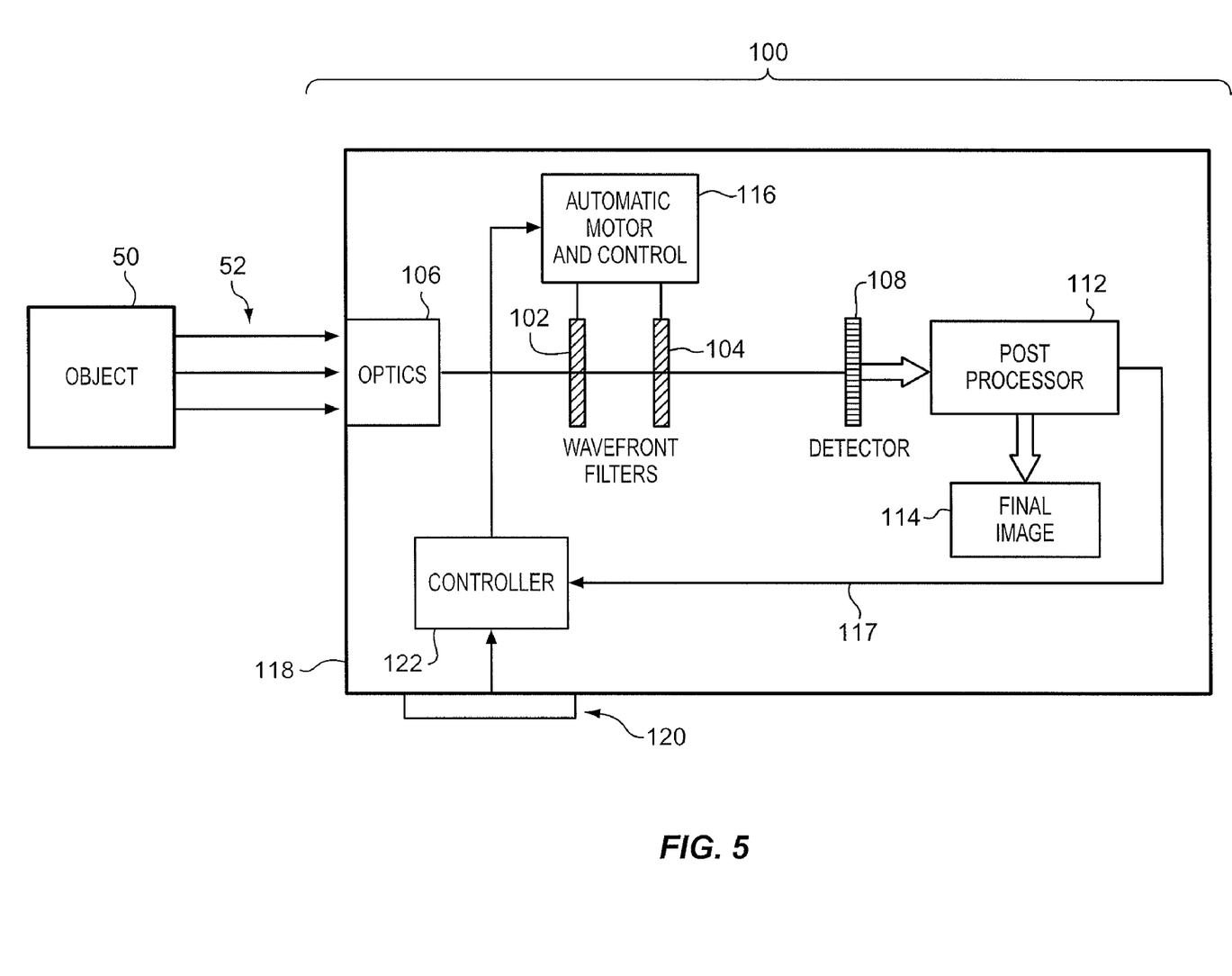
FIG. 5 shows the optical imaging system of FIG. 3 with a user interface and housing.

Optical system 100' may also allow for selective control of focusing, magnitude of the depth of field, and/or aberration reduction. More particularly, FIG. 5 shows one housing 118 that may encase components of system 100'. A user interface 120 mounts with housing 118, as shown. User interface 120 is in electrical communication with a controller 122 (e.g., a microprocessor) to control operation of motor and controller 116', in response to user commands at interface 120, so as to control positioning of filters 102, 104 (to effect phase modification of wavefront 101). Those skilled in the art appreciate that controller 122 may be part of motor and controller 116' as a matter of design choice. In one embodiment, controller 122 receives information 117 from post processor 112, the information for example detailing presence of misfocus and/or aberrations in final image 114. In one example, information 117 is used by controller 122 to direct motor and controller 116' to move filters 102, 104 and modify phase of wavefront 101, such as to control depth of field and aberration tolerance within system 100'. This control then adjusts the image quality of final image 114.

Figure 6:
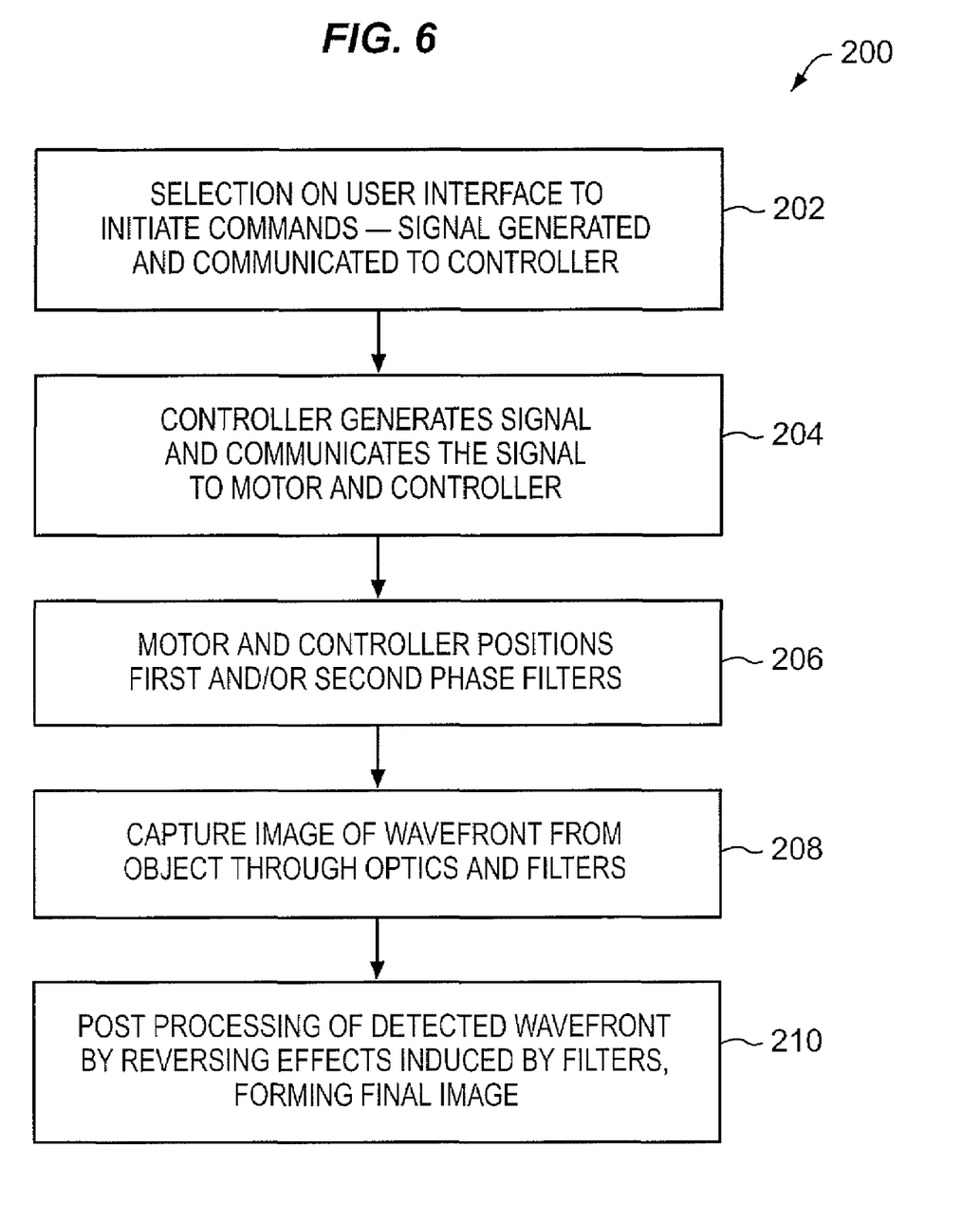
FIG. 6 shows one control process exemplifying operation of the optical system of FIG. 5.

FIG. 6 shows one process 200 facilitating operation of optical system 100', FIG. 5. In step 202, a user makes selections on user interface 120 regarding desired focusing, degree of depth of field, amount of anti-aliasing and/or aberration reduction within system 100'. In response to user selection, a signal is generated and communicated to controller 122. In step 204, controller 122 generates a command signal for communication to the motor and controller 116'. Motor and controller 116' then positions (e.g., rotates, translates, repositions) one or both of filters 102, 104, in step 206. Detector 108 then captures the image of wavefront 101, in step 208. In step 210, post processor 112 receives data from detector 108 and processes the data to reverse effects induced by filters 102, 104, to form final image 114 with user-selected imaging properties (e.g., depth of field, reduced aberrations, anti-aliasing).

Figure 7:
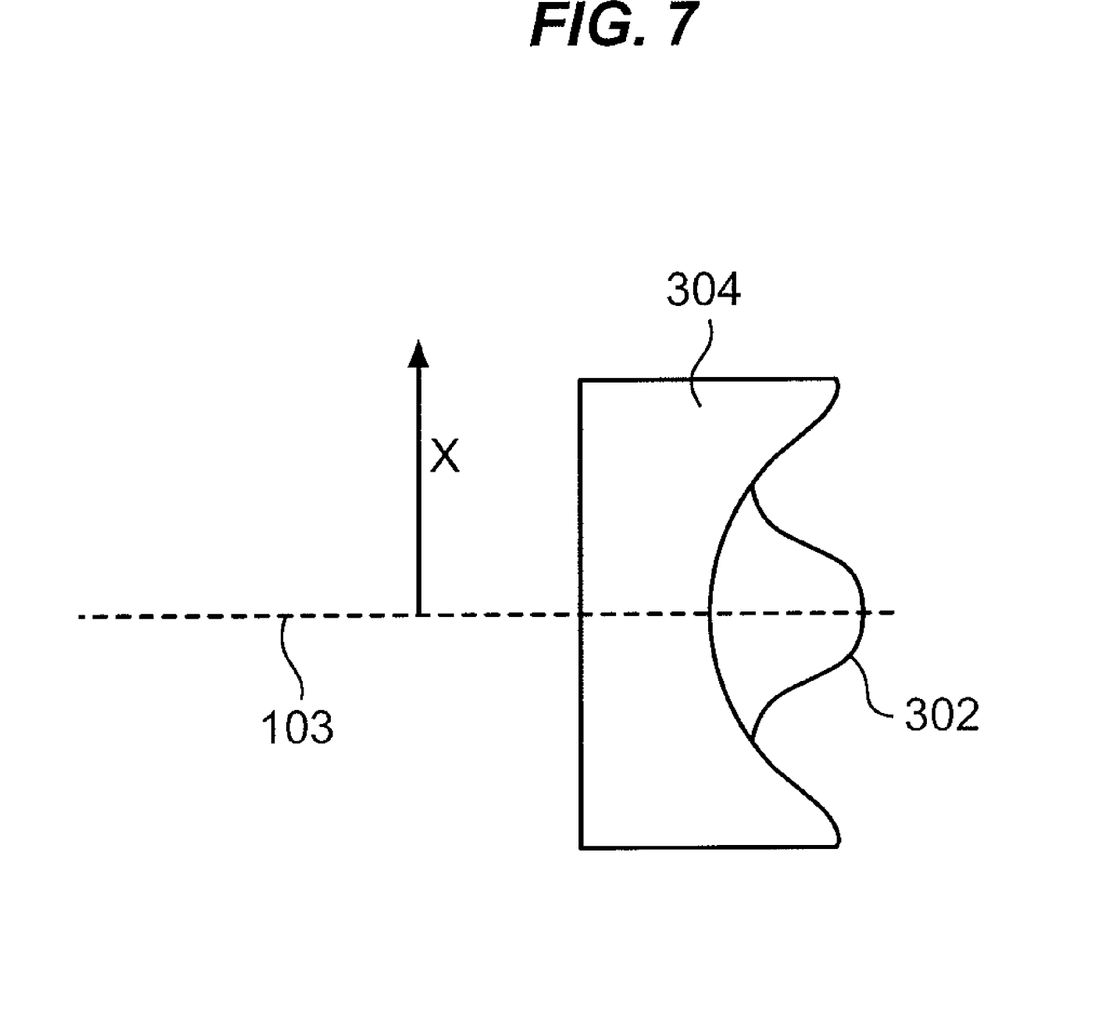
FIG. 7 shows one exemplary phase mask having variations in thickness.

FIG. 7 shows one phase form 302 of wavefront filters 102, 104 that may be used in optical system 100. Phase form 302 includes a body 304 of optical material having variations in thickness that induces phase change on wavefront 101. In one embodiment, form 302 implements a cubic phase function given by:

$$P(x,y) = \alpha x^3 + \beta y^3 + \delta x^2 y + \gamma x y^2 \quad \text{(Eq. 5)}$$

where P(x,y) represents the phase function of filters 102, 104 as a function of spatial coordinates (x,y), where (x,y) is the displacement location of form 302 from optical axis 103 (e.g., in FIG. 7 only axis x is shown). The constants $\alpha, \beta, \delta$, and $\gamma$ are chosen according to the particular characteristics desired for optical system 100. For example, with $\alpha = \beta$, and $\delta = \gamma = 0$, a rectangularly separable optical filter is formed. This leads to rectangularly separable processing within post processor 112 in controlling depth of field and aberrations.

Another phase function for form 302 provides an MTF that is circularly symmetric. The wavefront phase of the optical filter can be written in polar coordinates as:

$$P(r,\theta) = \alpha f(r) \cos(n\theta) \quad \text{(Eq. 6)}$$

where f(r) is a function dependent upon radial position r from a center of the phase function and $\theta$ is angular position about the center. By way of example, one phase function P(r,θ) is $(\alpha r^3 \cos(3\theta)$, where f(r) is $r^3$ and n is 3 (which also corresponds to Eq. 5 with the constants chosen as $\alpha = \beta$, $\delta = \gamma = -3\alpha$). The magnitude of the constant $\beta$ determines the amount of phase change implemented by filter(s) 102, 104, thus providing the selected imaging properties (e.g., depth of field, aberration-tolerance, or anti-aliasing).

If two wavefront filters of the form of Eq. 6 are placed adjacent to and parallel to each other with the optical centers of each (r=0) at or near optical axis 103, the effective phase from the combination can be approximated as:

$$P(r,\theta)_c = f(r)[\cos(n\{\theta-\phi\}) + \cos(n\{\theta+\phi\})] \quad \text{(Eq. 7)}$$

where each filter has been rotated an equal and opposite amount given by angle $\phi$. In such a configuration, only the relative angular position between the two wavefront filters is important. This particular symmetric alignment of Eq. 7 is used only to illustrate simplified mathematics. The form of the combination wavefront phase of Eq. 7 can be further simplified to:

$$P(r,\theta)_c = [2 \cos(3\phi)] f(r) \cos(3\theta) \quad \text{(Eq. 8)}$$

The phase of the combination is seen to vary between twice the phase of a single surface (when $\phi=n(\pi/3)$, $n=0,+/-1, +/-2, \ldots$) to zero or a constant surface (when $\phi=n(\pi/6)$, $n=+/-1,+/-2, \ldots$) through change of the relative rotation between the filters 102, 104. If the rotation orientation of one of the filters is reversed, the phase is described by the addition of a negative sign, equivalent to a different rotation.

Other general phase forms may be described in polar coordinates, such as:

$$P(r,\theta)=\cos(n\theta)A(r,\theta)+B(r) \tag{Eq. 9}$$

where $A(r,\theta)$ and $B(r)$ are functions of the radius (from optical axis 103) and $\theta$, and $\cos(n\theta)$ provides a non-rotationally symmetric rotational variation in the phase. The second term describes the general case, including displacement. For example, by fabricating the filter described by Eq. 6 onto the surface of a lens (e.g., form 302, FIG. 7), $A(r,\theta)$ is equal to $\alpha r^3 \cos(3\theta)$ and $B(r)$ is equal to $\phi r^2$, where $\phi$ describes the power of the lens.

From Eq. 8, placing two filters of the form of Eq. 9 adjacent to and parallel to each other, with equal and opposite rotations of $\phi$, results in a combined wavefront phase that can be approximated as:

$$P(r,\theta)_c=[2\cos(n\phi)]A(r)\cos(n\theta)+2B(r) \tag{Eq. 10}$$

The rotationally symmetric component $B(r)$ is unchanged by rotations while the non-rotationally symmetric combined wavefront phase can vary between twice that of a single element and zero depending on the relative rotation of the two filters.

The magnitudes of the non-rotationally symmetric components of the filters do not have to be identical. In such cases, the range of wavefront phase possible through rotation can be reduced. The rotationally symmetric terms $B(r)$ also do not have to be identical.

Those skilled in the art appreciate that other phase functions may be implemented with filters 102, 104 depending on the desired optical imaging properties for system 100. Moreover, phase filters 102, 104 may include reflective elements, holographic elements, elements including variations in index of refraction, spatial light modulators, holograms, adaptive optics, diffractive elements such as modulo $N\pi$ masks, and/or the like.

Figure 8:
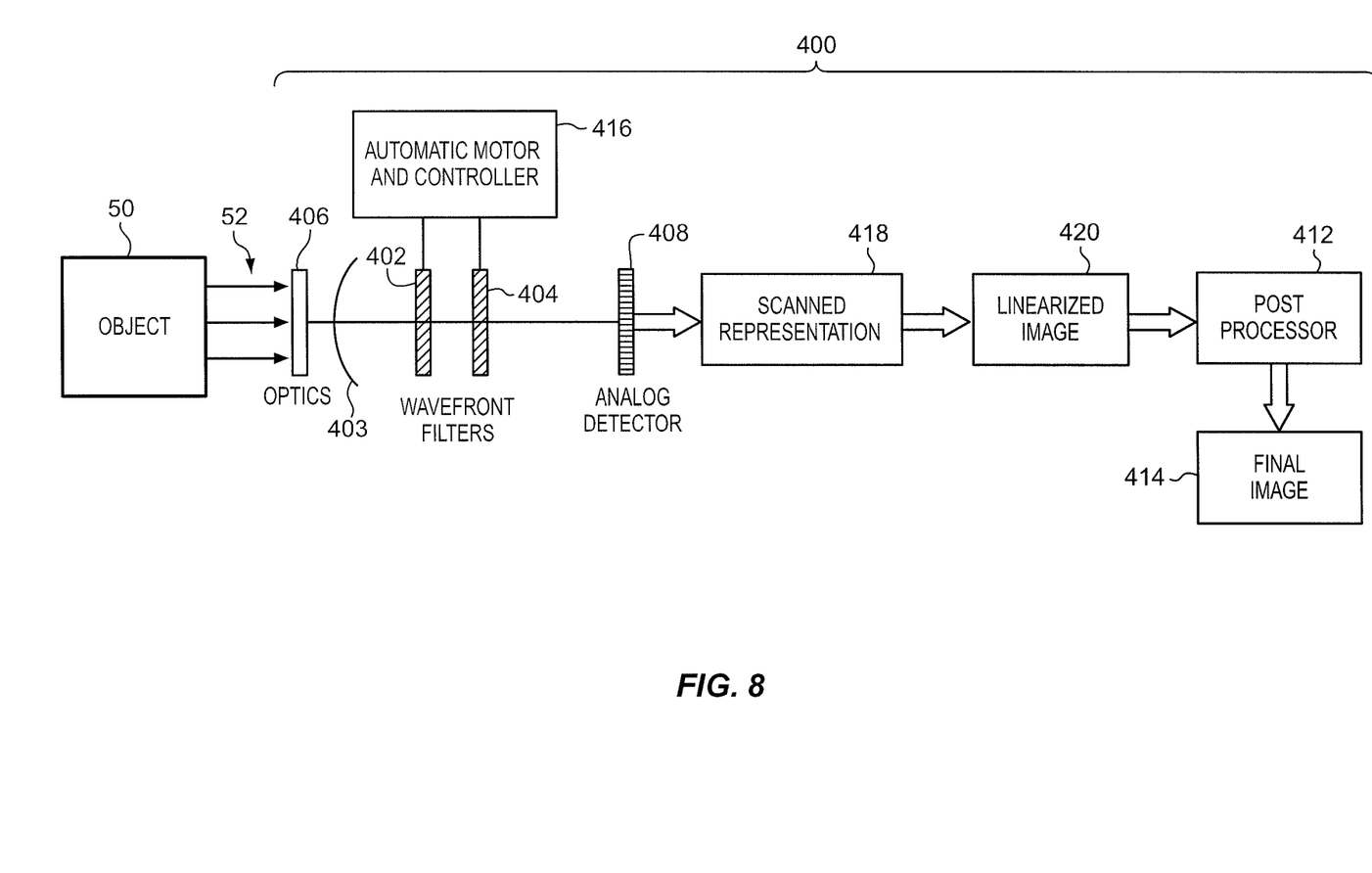
FIG. 8 shows one optical imaging system with mechanical adjustment of phase filters utilizing linearization for images detected by a non-linear analog detector.

FIG. 8 shows one optical system 400 similar to optical system 100 of FIGS. 3 and 4, with optics 406, a first aspherical optical wavefront filter 402, a second aspherical optical wavefront filter 404, a non-linear analog detector 408 and post processor 412, as well as automatic motor and controller 416. Wavefront 403 is formed from electromagnetic radiation 52 from object 50 and is focused by optics 406 through wavefront filters 402, 404 and to analog detector 408. Automatic motor and controller 416 rotates one or more of wavefront filters 402, 404 to effect mechanical adjustment of the wavefront phase. However, because of the non-linearity of analog detector 408—in that detector 408 has a non-linear response to the intensity of wavefront 403—post processor 412 cannot perform the function of removing wavefront coding or spatial blur induced by wavefront filters 402, 404 to produce a sharp and in-focus final image 414. For non-linear analog detectors 408, such as photographic film, the exposure curve is generally known or can be measured. Thus, the images detected by analog detector 408, representative of wavefront 403, may be linearized. Non-linear analog detector 408 is thus digitally scanned to generate a representation 418 of the image. The scanned representation 418 is then linearized to form a linearized image 420. Post processor 412 (e.g., a digital filter) processes linearized image 420 (in much the same way as post processor 112 processes an image-to remove effects of wavefront filters 102, 104) to increase depth of field (depth of focus) in final image 414.

Since certain changes may be made in the above methods and systems without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. An optical imaging system, comprising:
   optics for imaging a wavefront of electromagnetic radiation to form an image at a detector;
   a plurality of optical phase filters, each phase filter altering phase of the wavefront passing therethrough and cooperating to alter an optical transfer function of the system so that the system is less sensitive to misfocus as compared to the optical imaging system without the phase filters, and;
   an adjustment mechanism for adjusting a position of one or more of the phase filters.

2. Optical imaging system of claim 1, wherein the adjustment mechanism includes means for adjusting a position of one or more of the phase filters, to adjust aberration tolerance of the imaging system.

3. Optical imaging system of claim 1, wherein the adjustment mechanism includes means for adjusting a position of one or more of the phase filters, to adjust depth of field of the imaging system.

4. Optical imaging system of claim 3, the means for adjusting comprising a controller.

5. Optical imaging system of claim 4, the controller comprising a motor.

6. Optical imaging system of claim 3, wherein the means for adjusting responds to input from a user interface.

7. Optical imaging system of claim 3, wherein the means for adjusting comprises means for translating a first phase filter of the plurality of phase filters between at least two positions wherein the wavefront passes through separate portions of the first phase filter.

8. Optical imaging system of claim 3, wherein the means for adjusting comprises means for rotating at least one of the phase filters about an optical axis to effect phase changes to the wavefront.

9. Optical imaging system of claim 3, wherein the means for adjusting comprises means for tilting at least one of the phase filters to effect phase changes to the wavefront.

10. Optical imaging system of claim 3, further comprising an adjustable aperture stop, and wherein the means for adjusting is configured to adjust the position according to adjustment of the aperture stop such that depth of field of the imaging system remains constant.

11. Optical imaging system of claim 3, a focal length of the system being adjustable, and wherein the means for adjusting is configured to adjust the position of the one or more phase filters according to adjustment of the focal length such that depth of field of the imaging system remains constant.

12. Optical imaging system of claim 1, the phase filters comprising one or more of a phase mask, a reflective element, a holographic element, an element that includes variations in index of refraction, a spatial light modulator, adaptive optics and a diffractive element.

13. Optical imaging system of claim 1, wherein one or more of the phase filters are incorporated with the optics.

14. Optical imaging system of claim 1, wherein the plurality of phase filters consists of two filters.

15. Optical imaging system of claim 1, wherein the plurality of phase filters comprises more than two phase filters.

16. Optical imaging system of claim 1, each of the phase filters comprising an aspheric optical element.

17. Optical imaging system of claim 16 wherein the plurality of optical phase filters cooperate to implement a phase function of the form $P(r,\theta)=A(r,\theta)+B(\theta)$ wherein $P(r,\theta)$ represents phase as a function of r, denoting a radius from an optical axis of the system, and $\theta$, denoting a rotational position about the optical axis.

18. Optical imaging system of claim 16, wherein the plurality of optical phase filters cooperate to implement a cubic phase function.

19. Optical imaging system of claim 18, wherein the cubic phase function is of the form $P(x,y)=\alpha x^3+\beta y^3+\delta x^2 y+\gamma xy^2$, where $P(x,y)$ represents phase as a function of spatial coordinates (x,y).

20. Optical imaging system of claim 19, wherein $\alpha=\beta$ and $\delta=\gamma=0$ so that the phase filters form a rectangularly separable optical filter.

21. Optical imaging system of claim 1, further comprising a post processor for processing image data from the detector to reverse one or more imaging effects induced by the phase filters.

22. Optical imaging system of claim 21, wherein the post processor comprises a digital filter.

23. Optical imaging system of claim 21, the post processor configured to utilize position information of the phase filters.

24. Optical imaging system of claim 21, wherein the post processor removes a spatial blur generated by the phase filters.

25. An optical imaging system, comprising:
a detector;
optics having two or more optical elements for imaging a wavefront of electromagnetic energy onto the detector, wherein the optical elements comprise aspherical surfaces that cooperate to alter phase of the wavefront such that an optical transfer function of the optics is less sensitive to defocus as compared to the optics without the aspherical surfaces;
means for adjusting positions of the optical elements; and,
a post processor for reversing phase alteration induced by the aspherical surfaces to produce an in-focus electronic image.

* * * * *